(No Model.) 2 Sheets—Sheet 2.
J. COLLIER.
PHOTOGRAPHIC CAMERA.
No. 600,515. Patented Mar. 15, 1898.
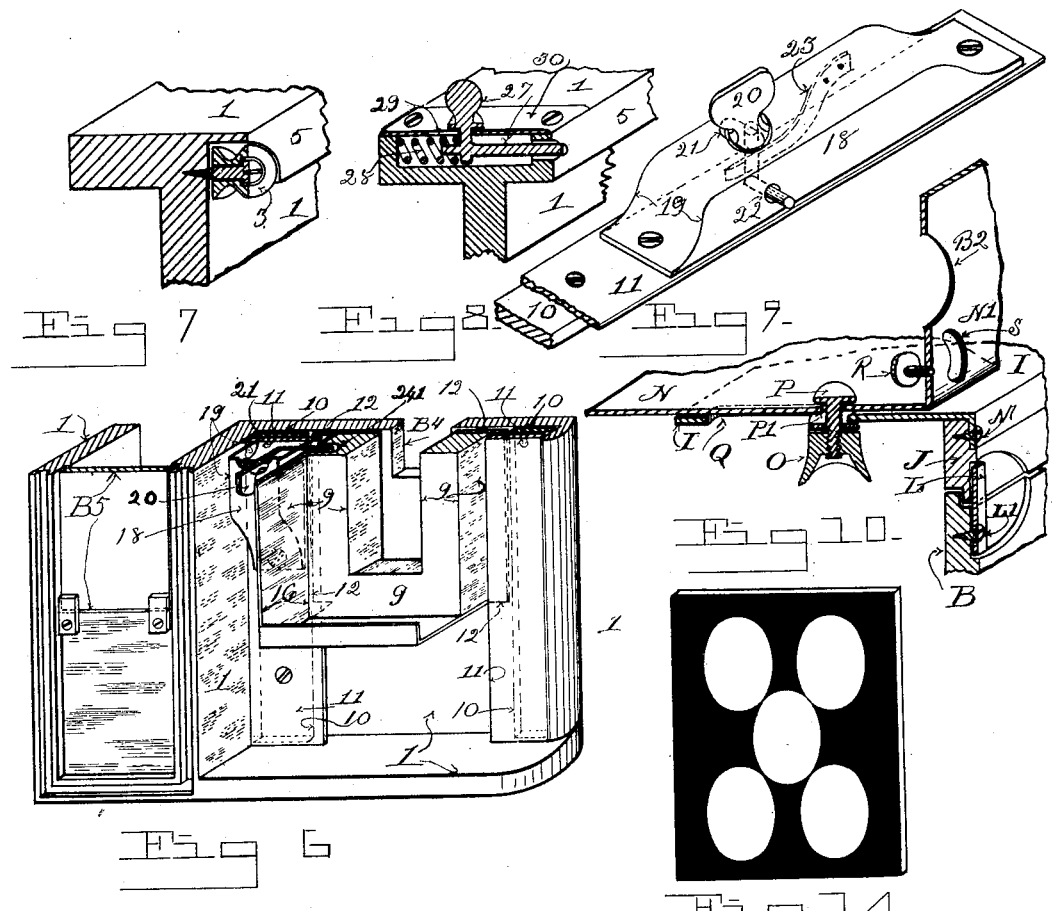
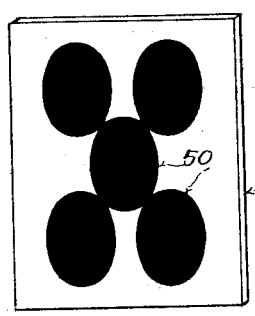
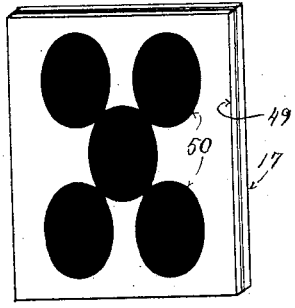
Witnesses
John H. Morcom
James P. Evans
Inventor
Joseph Collier
By his Attorney
H. S. Bailey

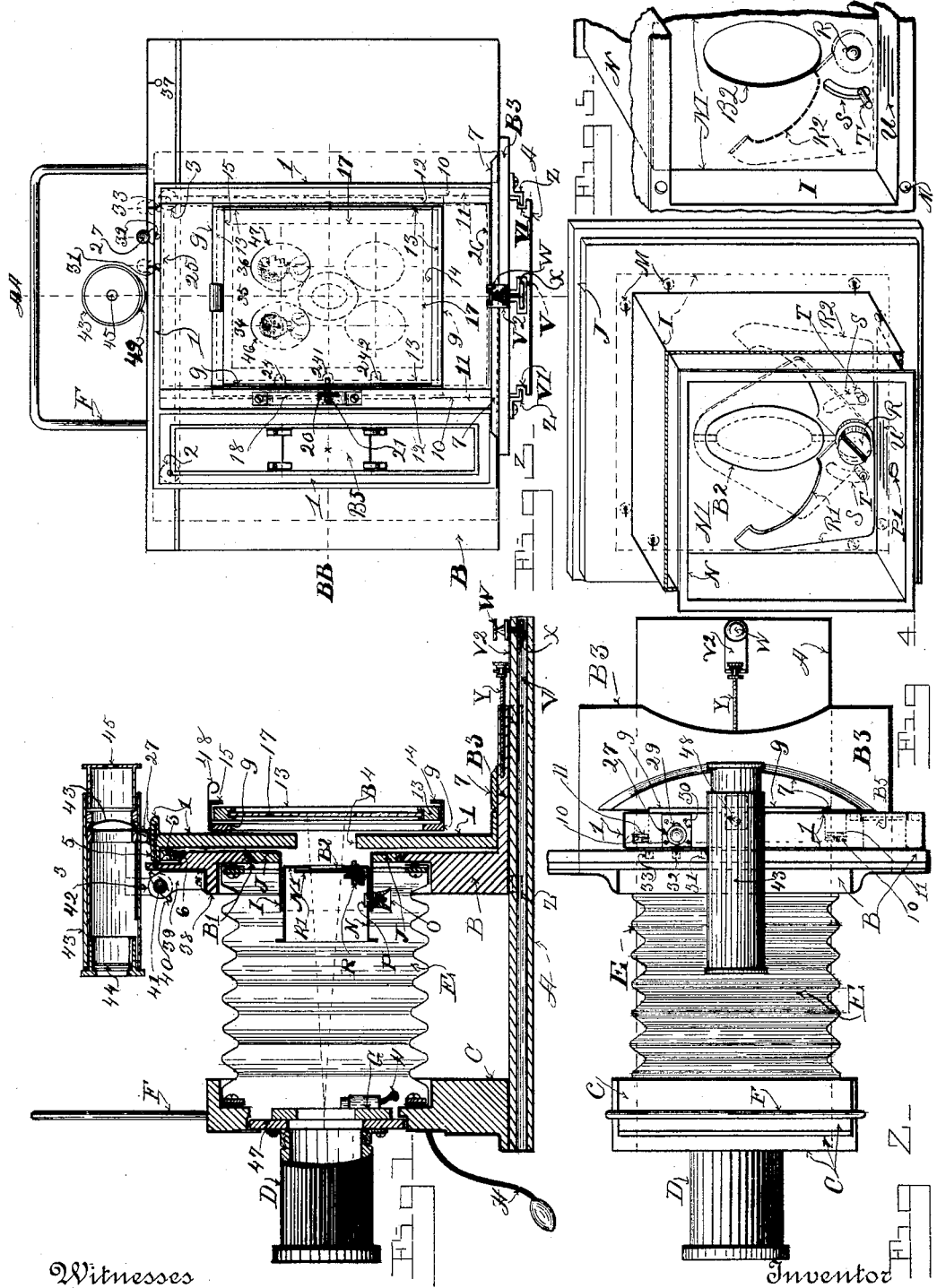

UNITED STATES PATENT OFFICE.

JOSEPH COLLIER, OF DENVER, COLORADO, ASSIGNOR OF ONE-HALF TO JOHN H. MORCOM AND JAMES P. EVANS, OF SAME PLACE.

PHOTOGRAPHIC CAMERA.

SPECIFICATION forming part of Letters Patent No. 600,515, dated March 15, 1898.

Application filed December 10, 1896. Serial No. 615,194. (No model.)

*To all whom it may concern:*

Be it known that I, JOSEPH COLLIER, a citizen of the United States of America, residing at Denver, in the county of Arapahoe and State of Colorado, have invented certain new and useful Improvements in Photographic Cameras; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in photography; and the objects of my invention are, first, to provide a photographic process which will permit a subject or person or a group of persons to be photographed on one negative plate in a number of independent places, the subject or person or group of persons being placed in each photograph or view in different positions; second, to provide means for photographing upon the negative plate, after the several views or impressions have been taken, a background of any kind without exposing or blurring the images already taken; third, to provide means for automatically vignetting the resulting pictures, if desired. In the present state of the art several views of a subject may be photographed and placed together, but an independent plate must be used for each view. These are then developed separately and then combined and printed. By means of my process but one negative plate is necessary and all the views are taken at one sitting in quick successive order and all the views on the plate are developed at the same time and are printed at the same time from the one negative, thus saving an immense amount of time and labor, as well as negative plates, while presenting the subject or subjects in a variety of different positions and producing an artistic photograph. I attain these objects by the mechanism illustrated in the accompanying drawings, in which—

Figure 1 represents a longitudinal sectional view of a photographic camera on line A A of Fig. 3 embodying such improvements as are necessary to carry my process into practice. Fig. 2 represents a plan view of Fig. 1. Fig. 3 represents an end elevation of the camera, looking toward the rear end. Fig. 4 represents a perspective view of a movable diaphragm used in the camera to increase or diminish the size of the image on the negative plate. Fig. 5 is a fragment of the same diaphragm in perspective, showing an opposite view. Fig. 6 represents a cross-section of the registering back on line B B of Fig. 3. Fig. 7 is a fragment of the registering back, showing a section through one of the rollers which supports it. Fig. 8 is a fragment of the registering back, showing the spring-catch in section, which is used to lock the dark slide in its various positions. Fig. 9 represents a perspective view of this same catch. Fig. 10 represents a fragmentary sectional view of the diaphragm-box. Fig. 11 is the protector; Fig. 12, the negative and protector plates placed together and in contact register with one another, showing the relation they occupy when it is desired to photograph a background around the images on the negative plate. Fig. 13 represents a completed print from the negative plate, showing the various views in different positions and a background of roses. Fig. 14 represents a vignette-plate, by means of which the negative plate or plain photograph may be vignetted.

Similar letters and figures of reference refer to similar parts throughout the several views.

Referring to Fig. 1, A designates the base of the camera; B, the adjustable end; C, the stationary lens-supporting end; D, the lens-supporting tube; E, the bellows; F, a support for the removable cloth covering, which is not shown; G, the shutter-box, and H the shutter-box air-tube. In the center of the adjustable end B of the camera I make a square aperture B', in which I fit a square box I, which is open at both ends. This box consists of a plate J. The edges of the aperture B' are rabbeted or stepped to form a bearing for the edges of the plate, which are likewise rabbeted to fit it. The plate may be removably secured in the aperture by means of turn-buttons L, as shown in Fig. 10, in which view a recess is formed partially in both the plate and end B, and a turn-button L is pivoted by a screw L' in the recess. Through the center of this plate I form a square aperture and extend through it a square sheet-metal tube I, which projects from it toward the lens end of the camera a short distance. The end of the tube extends through the plate and is turned up against its side and is secured to it by screws M, as shown in Fig. 4. Inside of the box I a second box-shaped member N is placed, which I term a "movable diaphragm." This is fitted to slide in and out of the box and is adjustably secured to the box by a thumb-nut O and bolt P, which passes through a hole P' in the bottom of the diaphragm and through a slot Q, formed in the bottom of the box, as shown clearly in the fragment view in Fig. 10. The inner end of this diaphragm-tube contains a transverse partition or diaphragm N', in the center of which is an aperture $B^2$, which may be of any shape—square, round, or irregular outline—but which I preferably make oval or elliptical. Below the center of this aperture $B^2$, I pivot, by means of the screw R, two shutter-leaves R' and $R^2$, arranging them one on each side of the aperture and forming in each a half of an oval-shaped recess or notch somewhat smaller than that in the diaphragm. I make a slot S in the diaphragm concentric with the pivotal center and on each side of it and at equal distances from it and secure pins T to the shutter-leaves in positions to extend through and move in the slots. These pins are moved in the slots by the fingers of the operator to close or open the shutter-leaves over the opening in the diaphragm, and when they are closed, as shown by the dotted lines in Fig. 4, they reduce the size of opening through the diaphragm and form an auxiliary oval aperture. Additional pairs of shutter-leaves may be used to make still smaller apertures in the diaphragm.

The size of the aperture in the diaphragm, together with the position of the diaphragm relative to the lens and the negative plate, governs the size of the image on the plate and also the relative positions of the independent views of the subject to one another on the plate.

The nearer the diaphragm is to the lens the larger will be the view of the subject on the plate, and the farther away it is placed the smaller will be the view. For this reason the diaphragm is arranged to be moved toward or from the lens, as above described, and to be secured in any desired position.

One or more auxiliary apertures for the diaphragm smaller than the fixed size may be used to still further reduce the size of the image of each view on the plate if the limit of the movement of the diaphragm in its supporting-box is not sufficient to give the desired result.

In order to assist the operator in the adjustment of the diaphragm to the size of the image required, I provide the inside bottom of the diaphragm's supporting-box with a graduated scale U, which is shown in Figs. 4 and 5. The size of the aperture in the movable diaphragm is governed by the size of the negative plates the camera takes. Thus, for example, if the negative plates are of a cabinet size the size of the aperture in the diaphragm should be such as to make two or three or four or more independent views of the subject in the length and breadth of the negative plate, so as to keep the outlines of the aperture in the diaphragm which shows in each view separated from one another by equal margins of space or to just touch one another, as shown in Fig. 12. I preferably arrange the size of the main aperture in the diaphragm so as to provide the surface of the negative plate with five independent views, which are arranged to just touch one another, as shown in Fig. 13, (as all plain photographs show the outlines of the aperture through which the rays of light pass from the lens to the negative plate,) and the views can be diminished or increased in size to take up as much or as little of the surface of the plate as desired by means of the adjustment of the diaphragm and the auxiliary aperture. By using the auxiliary aperture three pictures can be made in each row or nine on a plate. I preferably make five, as I think it makes a more artistic grouping than either more or less than five views.

I will now describe the means I employ to move with precision the negative plate and its frame quickly from one position to another to take the different views at one sitting in successive order. The movable end B of the camera is provided with a base portion $B^3$, which extends rearward on the base-plate A, on which the camera rests. A T-slot V is formed along the center of the base-plate, and in its edges a square groove V' is made. A clip $V^2$ is adjustably secured in the T-slot by means of a thumb-nut W and its bolt X. The clip $V^2$ is provided with an upturned end, in which is rotatively journaled a long screw Y, which threads into the center of the base portion $B^3$ of the camera's movable end B, which is adjustably secured to the base by means of the said screw and clip. To the under side of the lower edge of the end B are secured dogs Z, which extend freely into the grooves of the base-plate and act as guides as well as to hold the part B in alinement with the lens portion on the base. The end portion B of the camera is provided with a sliding frame 1, which I designate a "registering back." This registering back is supported on two rollers 2 and 3, which have V-shaped treads and are pivotally secured to it at each upper end. The rollers are set into an overhanging portion 5, formed at the top of the back, as shown in Fig. 7, which is a fragment of the top portion of the registering back and shows one of the rollers in section. The rollers rest and run on a track 6, formed by an inward step or shelf portion at the top of the end B, which is made V-shaped to match the treads of the rollers and hold them to the track.

The bottom portion of the registering back extends close to the base and is freely confined against the end B by a projecting guide-plate 7, which is secured to the base portion B³ of the end B. A square aperture B⁴ is formed in the center of the back, through which light is admitted to the negative-plate and its holding-frame. A sectional perspective view of the lower half of the registering back from the center line B B of Fig. 3 is shown in Fig. 6. At one end it is provided with an adjusting-glass B⁵. The registering back B is movable transversely of the body of the camera. This form of registering back is not new, except that the frame 9, which holds the dark-slide or negative-plate-holding frame, (which is not shown in Fig. 6,) is fixed in a central position to the registering back, while it is necessary in my process to have it movable vertically on both sides of its central position and adapted to be locked in predetermined positions. I accomplish this by forming a vertical slideway in the front of the registering back for the frame 9 to move in. This slideway consists of the strips 10, which rest against and are secured to the surface of the registering back, and the strips 11, which are secured to strips 10 and extend over them, thereby forming a slideway between them. The frame 9 fits between the strips 11, and strips 12 are secured to it on either side, which extend under the strips 11 and fit freely the slideways.

The dark slide 13 (see Figs. 1 and 3) may be of any form in common use, and it slides into the frame 9 between the projecting steps 14 and 15, which are arranged at the top and bottom edges, and is placed against the side 16, as shown in Fig. 3. The negative plate 17 is shown in dotted lines in that view and also in section in Fig. 1 inside the dark-slide frame. The frame 9 is secured in a central position by a spring-catch 18, a fragmentary section of which is shown in Fig. 6 and a perspective view in Fig. 9. This catch, as illustrated, consists of a casing 19, which is secured to the top of one of the strips 11. The casing contains a combined sliding bolt and thumb-push 20, which works in a slot 21 in the top casing, and the bolt issues through a hole 22 in the side of the casing. The bolt is held resiliently by a spring 23 to bear against the edge of the frame and to spring into either one of the three holes 24, 24¹, and 24² made inside of the frame 9, which are positioned to lock the frame in the various vertical positions necessary to arrange the images in the vertical order shown in Fig. 13. There are consequently three holes (see Fig. 3) in the side of the frame for the bolt to enter, one opposite the central view and one opposite the top and bottom views, and the frame can be moved to and secured at either point by the catch, the dotted lines 25 and 26 in Fig. 3 showing the limit of the upper and lower movement of the frame 9 in making these vertical movements.

In order to move the registering back sidewise with precision, I provide it with a spring-catch, which is shown in section in Fig. 8. As illustrated in this view, it consists of a combined finger-push and bolt 27, resiliently controlled in one direction of its movement by a spring 28, the catch being seated in a recess formed in the top edge of the registering back and working in a slot 29, formed in a plate 30, which is secured over the recess. Registering holes 31, 32, and 33 are made in the opposing face of the top edge of the end B of the camera, in which the end of the bolt is adapted to enter. These holes are positioned at distances apart corresponding to the horizontal distances between the centers of the views on the negative plate and picture-card, which is represented on the negative plate by the dotted lines 34, 35, and 36. A lateral movement of the registering back until the catch registers with the registering hole 37 will bring the adjusting-glass B⁵ to the center of the camera. To a step portion 38, forming a part of the end B, I secure a bracket 39, to which is pivoted by a thumb-nut 40 and bolt 41 a pendant 42, which forms a part of a small telescope which I term a "finder." As illustrated, it comprises a tube 43, in which is mounted a suitable plano-convex or biconvex lens 43 and a diaphragm 44 in front of the lens of the same size and shape as the diaphragm in the body of the camera and an eye-hole 45 in the opposite end, which is otherwise closed. Any common form of finder may, however, be used instead of the one illustrated.

In order to photograph a subject—say, for example, a person—and obtain five different views, it is only necessary for the operator to adjust the camera for focus as is always the case and then to adjust the diaphragm to obtain the size of views required. If then the registering back is moved to the registering hole 33 to the right of the position shown in Fig. 3 and the frame 9 and dark-slide-holding frame with a sensitive plate in place is moved down to register with its catch in the hole 24 in its side, a picture would be taken in the upper left-hand corner 46 of the negative plate. The position of the person sitting is then changed and the registering back instantly moved to the left to the registering hole 31, leaving the frame 9 in the same position, and the next impression taken at point 47 on the negative plate. The registering back is then changed to the center registering hole 32 and the frame 9 moved up to register its catch in the center hole 24¹, which is the position shown in Fig. 3. The position of the sitting person is again changed and the third impression taken at the center of the plate, and so on until all five are taken. The finder is used simply to locate the sitter. When it is desired to make smaller views than the regular aperture in the diaphragm will produce or to make a negative of nine views, the auxiliary aperture of the diaphragm must be used. To do this, the operator must move the registering back to one side in order that he may extend his fingers into the diaphragm-box I in the camera end B and move the pins to close the shutter-leaves together. The adjustment of the diaphragm toward or from the lens is made from the lens end of the camera, the lens-tube and a plate 47, which is threaded to it, being made detachable from the stationary end in all cameras. This allows the operator to reach the thumb-nut under the diaphragm-supporting box from the front end and loosen it and after adjustment of the diaphragm to tighten it. The adjustment could be as well made by a bar or shaft extending through the front of the camera and having its inner end threaded to a nut fixed to the diaphragm and extending freely down through the slot in the diaphragm's supporting-box.

48 designates a finger-clip which is secured to the top of the dark-slide frame to assist in moving it up and down. The result is one negative plate containing five different independent pictures, which may be developed and cards printed from it in the usual manner. To photograph a background of any kind—such as a group of flowers, a sunset scene, or a landscape—upon this negative plate without marring or blurring the images, I proceed as follows: A second sensitive or negative plate 49 of the same size is placed in the camera and upon it is photographed five oval blank spots by exposure, say against a white background, the registering back and dark-slide-holding frame being moved through all five registering changes, as was the negative picture-plate. When developed, a plate similar to Fig. 11 is the result. This plate I term a "protector." But one of them need be made, as it can be used over and over again with negatives indefinitely until broken. I then take the two plates and place them together in the dark room in any common camera-slide, adjusting the edges of the two plates until they are parallel, as shown in Fig. 12, which makes the dark spots 50 register directly over the images on the negative plate, and then expose them to any desired background, which is photographed on all the surface of the picture-negative plate except the ovals which define the limits of the picture, which are protected by the oval dark spots of the protector. The negative is then developed, and proofs printed from it contain the five views surrounded by the background, which, for example, may have been a view or painting of a large rose-bush, the proof when mounted producing a cabinet photograph similar to Fig. 13. Such a photograph is a plain photograph with a background. To produce automatically a vignette cabinet photograph or a vignette of any subject, which is a photograph in which the images are presented in a clear light-colored or white field on the printed proofs, that extends to almost the edges of the images, and in which such dark portions as remain die out by gradual blending into the light background, the form of the aperture in the diaphragm being entirely obliterated, I take the protector-plate, Fig. 11, and by contact print on another and third sensitive plate, make a plate like Fig. 14, which I term a "vignetting-plate," it being the opposite of the protector-plate. I then take the vignetting-plate and use it in the printing-frame on top of the original negative plate or separate it from it by any thickness of glass desired, which gives a white or modified white background on the spaces around the images on the printed proof.

I do not wish to confine myself strictly to the exact arrangement of the camera shown and described or to the exact steps described in the process of producing the different styles of photographs herein described, as changes may be made without departing from the spirit of my invention.

To better illustrate and for a clearer understanding of the results of my improvements in photography I submit the following photographs, of which No. 1 is a plain cabinet photograph without any background. No. 2 is a plain photograph with a background of roses taken from a large photograph of a rose-bush growing against the side of a house. No. 3 is a similar photograph with a background taken from a large photograph of a Colorado sunset. Nos. 4 and 5 are vignette cabinets.

Having described my invention, what I claim as new, and desire to secure by Letters Patent, is—

1. The combination in a camera of a square tube having at one end a flange arranged at right angles to its length and a square block secured to the flange of said square tube, and also removably secured to the movable back end of the camera, substantially as described.

2. The combination in a camera of the back end provided with a removable center portion, means including turn-buttons for securing said center portion to said back end, a square tube secured to said center portion, a second square tube slidably fitted in the first-named square tube, a diaphragm at one end of said second-named tube adapted to define the size of the lens's field the operator wishes projected upon the negative plate of the camera and two oppositely-disposed shutter-leaves pivoted at one end to said diaphragm and adapted to reduce the lens's field smaller than the field projected through said diaphragm and means including a finger clasping-pin secured to each leaf, for operating the said shutter-leaves substantially as described.

3. The combination with the movable back end of a camera, of the square tube removably secured thereto, the inner tube and adjustable diaphragm, means including a thumb-nut and bolt for releasing and securing said inner tube in predetermined adjusted positions, lengthwise of the outer tube and to and from the camera-lens, with the shutter-leaves and the operating-pins, substantially as described.

4. The combination with the camera of the movable back end having a removable center portion, the turn-buttons for securing said central portion to said back end, and the square tube secured to said central portion and projecting toward the camera-lens, with a second square tube adjustably secured inside of the first-named tube, a diaphragm across the second-named tube containing a lens-ray passage of predetermined size, and with two oppositely-disposed shutter-leaves pivoted centrally by a common pivot to said diaphragm, and having an equal portion of each leaf cut away from their opposing edges, and adapted to form when folded together a lens-field space smaller than the lens-field space of said diaphragm, with means substantially as described and including a bolt and thumb-nut for adjusting and securing said second-named tube to the first-named tube, substantially as described.

5. The combination in a camera, of the square tube removably secured to the movable end of the camera, the inner tube having the adjustable diaphragm, means for adjusting said inner tube lengthwise of the outer tube and to and from the camera-lens, with the registering back having strips secured to its front wall adapted to form vertical guideways, and with a dark-slide-holding frame having strips secured to its sides adapted to extend into said guideways, a spring-controlled finger-catch secured to said registering back and three notches arranged at predetermined points near the center and ends of one side of said plate-holding frame adapted to receive the said finger-catch, substantially as described.

6. The combination in a camera of a square tube removably secured to the movable end of the camera centrally of the axis of the lens, a movable diaphragm containing a predetermined size of lens field adjustably secured in said tube, and shutter-leaves, arranged and adapted to decrease the size of the lens-field of the camera to a predetermined size, pivoted centrally to said diaphragm substantially as described.

In testimony whereof I affix my signature in presence of two witnesses.

JOSEPH COLLIER.

Witnesses:
JOHN H. MORCOM,
JAMES P. EVANS.